(12) United States Patent　　(10) Patent No.: US 11,361,905 B2
Jeong et al.　　(45) Date of Patent: Jun. 14, 2022

(54) MULTI-LAYERED CERAMIC ELECTRONIC COMPONENT

(71) Applicant: SAMSUNG ELECTRO-MECHANICS CO., LTD., Suwon-si (KR)

(72) Inventors: Do Young Jeong, Suwon-si (KR); Je Jung Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 63 days.

(21) Appl. No.: 16/931,840

(22) Filed: Jul. 17, 2020

(65) Prior Publication Data

US 2021/0090808 A1　Mar. 25, 2021

(30) Foreign Application Priority Data

Sep. 19, 2019　(KR) .......................... 10-2019-0115391

(51) Int. Cl.
  *H01G 4/30*　(2006.01)
  *H01G 4/12*　(2006.01)
  *H01G 4/248*　(2006.01)
  *H01G 4/012*　(2006.01)

(52) U.S. Cl.
  CPC .............. *H01G 4/30* (2013.01); *H01G 4/012* (2013.01); *H01G 4/1227* (2013.01); *H01G 4/248* (2013.01)

(58) Field of Classification Search
  CPC .......... H01G 4/33; H01G 4/012; H01G 4/232; H01G 4/30; H01G 4/12; H01G 4/1227; H01G 4/248
  See application file for complete search history.

(56) References Cited

U.S. PATENT DOCUMENTS

| 2004/0042156 | A1* | 3/2004 | Devoe ...................... H01G 4/38 361/321.2 |
| 2009/0154055 | A1* | 6/2009 | Takashima ............... H01G 4/30 361/301.4 |
| 2010/0128413 | A1* | 5/2010 | Takashima ............. H01G 4/012 361/306.3 |

(Continued)

FOREIGN PATENT DOCUMENTS

| JP | 2874380 B2 | 3/1999 |
| JP | 2016-001721 A | 1/2016 |
| KR | 10-2005-0093879 A | 9/2005 |

*Primary Examiner* — Michael P McFadden
(74) *Attorney, Agent, or Firm* — Morgan, Lewis & Bockius LLP

(57) ABSTRACT

A multilayer ceramic electronic component includes a ceramic body includes: a ceramic body including a capacitance formation portion including a dielectric layer and first and second internal electrodes disposed to be stacked in a third direction with the dielectric layer interposed therebetween, a margin portion disposed on both surfaces of the capacitance formation portion in a second direction, and a cover portion disposed on both surfaces of the capacitance formation portion in the third direction, and; and an auxiliary electrode spaced apart from the capacitance formation portion, and disposed to be in contact with one of the first and second external electrodes. The auxiliary electrode is spaced apart from first surface and the second surface of the ceramic body in a first direction.

26 Claims, 7 Drawing Sheets

(56) References Cited

U.S. PATENT DOCUMENTS

| | | | |
|---|---|---|---|
| 2012/0075766 A1* | 3/2012 | Nishioka | H01G 4/005 |
| | | | 361/301.4 |
| 2012/0320495 A1* | 12/2012 | Akazawa | H01G 4/12 |
| | | | 361/321.2 |
| 2015/0255213 A1* | 9/2015 | Lee | H05K 1/18 |
| | | | 174/258 |
| 2015/0340155 A1 | 11/2015 | Fukunaga | |
| 2016/0240317 A1* | 8/2016 | Ro | H01G 4/30 |

* cited by examiner

I-I'

II-II'

'A'

'B'

II-II'

MULTI-LAYERED CERAMIC ELECTRONIC COMPONENT

CROSS-REFERENCE TO RELATED APPLICATION

This application claims benefit of priority to Korean Patent Application No. 10-2019-0115391 filed on Sep. 19, 2019 in the Korean Intellectual Property Office, the disclosure of which is incorporated herein by reference in its entirety.

TECHNICAL FIELD

The present disclosure relates to a multilayer ceramic electronic component, and more particularly, to a multilayer ceramic electronic component having excellent reliability.

BACKGROUND

In recent years, miniaturization of multilayer ceramic capacitors has been required in accordance with miniaturization, slimming, and multi-functionalization of electronic products, and mounting of multilayer ceramic capacitors has also been highly integrated.

A multilayer ceramic capacitor, a type of electronic components, is mounted on a printed circuit board of various electronic products of video devices such as liquid crystal displays (LCDs), plasma display panels (PDPs), and the like, computers, personal digital assistants (PDAs), mobile phones, and the like to serve to charge or discharge electricity.

The multilayer ceramic capacitor may be used as a component of various electronic devices due to advantages of its small size, high capacity, and easy mounting.

Meanwhile, as industry interest in electronic components has recently increased, high reliability and high strength characteristics are also required for multilayer ceramic capacitors to be used in automobiles or infotainment systems.

In particular, when the multilayer ceramic capacitor is exposed to a harsh environment, peeling or cracking of the electrode may occur due to oxidation of the external electrode, bending caused by external force, or the like, and penetration of moisture may cause IR degradation and/or short, or the like. In such a harsh environment, there is a need for improvement in internal and external structures for improving moisture resistance reliability and mechanical strength.

SUMMARY

An aspect of the present disclosure is to provide a multilayer ceramic electronic component having excellent bending strength.

Another aspect of the present disclosure is to provide a multilayer ceramic electronic component having excellent moisture resistance reliability.

Another aspect of the present disclosure is to provide a multilayer ceramic electronic component with improved mechanical strength.

According to an aspect of the present disclosure, a multilayer ceramic electronic component may be provided. The multilayer ceramic electronic component includes: a ceramic body including a capacitance formation portion including a dielectric layer and first and second internal electrodes disposed to be stacked in a third direction with the dielectric layer interposed therebetween, a margin portion disposed on both surfaces of the capacitance formation portion in a second direction, and a cover portion disposed on both surfaces of the capacitance formation portion in a third direction, and including first and second surfaces opposing each other in a first direction, third and fourth surfaces opposing each other in a second direction, and fifth and sixth surfaces opposing each other in the third direction; first and second external electrodes disposed on the fifth and sixth surfaces of the ceramic body, respectively; and an auxiliary electrode spaced apart from the capacitance formation portion, and disposed to be in contact with one of the first and second external electrode. The auxiliary electrode is spaced apart from the first surface and the second surface of the ceramic body.

According to another aspect of the present disclosure, a multilayer ceramic electronic component includes: a ceramic body including first and second surfaces opposing each other in a first direction, third and fourth surfaces opposing each other in a second direction, and fifth and sixth surfaces opposing each other in a third direction, and including a dielectric layer and first and second internal electrodes stacked in the third direction with the dielectric layer interposed therebetween; first and second external electrodes disposed on the first and second surfaces of the ceramic body, respectively; and an auxiliary electrode exposed to one of the fifth and sixth surfaces and connected to one of the first and second external electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
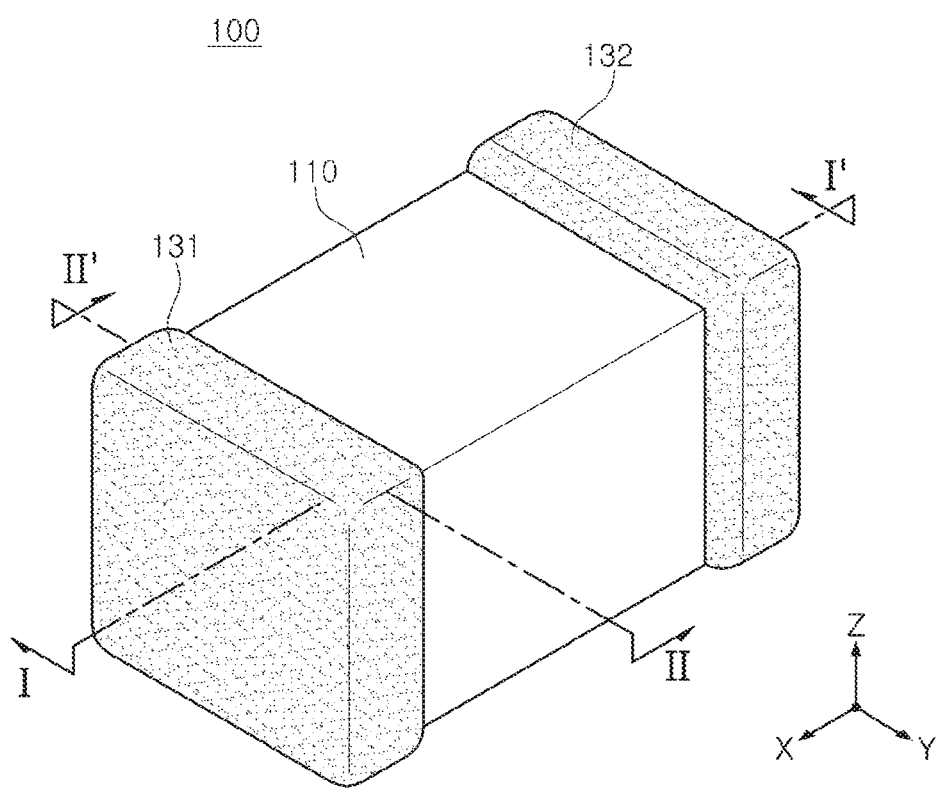
FIG. 1 is a schematic perspective view illustrating a multilayer ceramic electronic component according to an embodiment of the present disclosure.

Hereinafter, embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, an X direction may be defined as a first direction, an L direction or a longitudinal direction, a Y direction as a second direction, a W direction or a width direction, and a Z direction as a third direction, a T direction, or a thickness direction.

Hereinafter, a multilayer ceramic electronic component according to an embodiment of the present disclosure will be described in detail with reference to FIGS. 1 to 6.

Referring to FIGS. 1 to 6, a multilayer ceramic electronic component 100 includes: a ceramic body 110 including a capacitance formation portion ($\alpha_W$, $\alpha_T$) including a dielectric layer 111 and first and second internal electrodes 121 and 122 disposed to be stacked in a third direction (a Z direction) with the dielectric layer 111 interposed therebetween, a margin portion (m) disposed on both surfaces of the capacitance formation portion ($\alpha_W$, $\alpha_T$) in a second direction (a Y direction), and a cover portion (c) disposed on both surfaces of the capacitance formation portion ($\alpha_W$, $\alpha_T$) in a third direction (a Z direction), and including first and second surfaces S1 and S2, opposing each other in a first direction (a X direction), third and fourth surfaces S3 and S4 opposing each other in a second direction (a Y direction), and fifth and sixth surfaces S5 and S6 opposing each other in a third direction (a Z direction); first and second external electrodes 131 and 132 disposed on the first surface S1 and the second surface S2 of the ceramic body 110, respectively; and two or more auxiliary electrodes 141 and 142 spaced apart from the capacitance formation portion ($\alpha_W$, $\alpha_T$), and disposed to be in contact with the first and second external electrodes 131 and 132. The auxiliary electrodes 141 and 142 may be disposed in the third direction (the Z direction) of the ceramic body 110.

Hereinafter, a multilayer ceramic electronic component according to an embodiment of the present disclosure will be described, but the multilayer ceramic capacitor is particularly described, but is not limited thereto.

In an embodiment of the present disclosure, the ceramic body 110 may include a capacitance formation portion ($\alpha_W$, $\alpha_T$) including a dielectric layer 111 and first and second internal electrodes 121 and 122, a margin portion (m) disposed on both surfaces of the capacitance formation portion ($\alpha_W$, $\alpha_T$) in the second direction (the Y direction), and a cover portion (c) disposed on both surfaces of the capacitance formation portion ($\alpha_W$, $\alpha_T$) in the third direction (the Z direction).

Although a specific shape of the ceramic body 110 is not particularly limited, as shown, the ceramic body 110 may be formed in a hexahedral shape or a shape similar thereto. Due to shrinkage of ceramic powder contained in the ceramic body 110 during a firing process, the ceramic body 110 may have a substantially hexahedral shape, although not a hexahedral shape having perfectly straight lines. The ceramic body 110 may have first and second surfaces S1 and S2 opposing each other in the longitudinal direction (the X direction), third and fourth surfaces S3 and S4 connected to the first and second surfaces S1 and S2 and opposing each other in the width direction (the Y direction), and fifth and sixth surfaces S5 and S6 connected to the first and second surfaces S1 and S2, connected to the third and fourth surfaces S3 and S4 and opposing each other in the thickness direction (the Z direction).

The ceramic body 110 may be formed by alternately stacking a ceramic green sheet on which a first internal electrode 121 is printed and a ceramic green sheet on which a second internal electrode 122 is printed in the thickness direction (the Z direction).

The capacitance formation portions ($\alpha_W$, $\alpha_T$) may be formed by alternately stacking a dielectric layer 111 and internal electrodes 121 and 122 in a third direction (the Z direction). A plurality of dielectric layers 111 forming the capacitance formation portion may be in a sintered state, and boundaries between adjacent dielectric layers 111 may be integrated such that they may be difficult to confirm without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used.

In addition, as a material for forming the dielectric layer 111, a variety of ceramic additives, organic solvents, plasticizers, binders, dispersants, and the like may be added to powder particles such as barium titanate ($BaTiO_3$), and the like, depending on the purpose of the present disclosure.

For example, the dielectric layer 111 may be formed by applying and drying a slurry formed by including powder such as barium titanate ($BaTiO_3$) on a carrier film to prepare a plurality of ceramic sheets. The ceramic sheet may be formed by mixing ceramic powder, a binder, and a solvent to prepare a slurry, and manufacturing the slurry into a sheet having a thickness of several μms by a doctor blade method, but is not limited thereto.

The multilayer ceramic electronic component of the present disclosure may be disposed such that a plurality of internal electrodes 121 and 122 are disposed to oppose each other with the dielectric layer 111 interposed therebetween. The internal electrodes 121 and 122 may include first and second internal electrodes 121 and 122 that are alternately disposed to oppose each other with the dielectric layer 111 interposed therebetween.

The first internal electrode 121 may be exposed to one surface S1 of the ceramic body 110 in the first direction (the X direction), and a portion exposed to the one surface S1 in the first direction (the X direction) may be connected to a first external electrode 131. The second internal electrode 122 may be exposed to the other surface S2 of the ceramic body 110 in the first direction (the X direction), and a portion exposed to the other surface S2 of the first direction (the X direction) may be connected to a second external electrode 132. The first and second internal electrodes 121 and 122 may be electrically separated from each other by the dielectric layer 111 disposed in a middle.

A material for forming the first and second internal electrodes 121 and 122 is not particularly limited, and for example, the first and second internal electrodes 121 and 122 may be formed by using a conductive paste including one or more materials of silver (Ag), palladium (Pd), gold (Au), platinum (Pt), nickel (Ni), copper (Cu), tin (Sn), tungsten (W), titanium (Ti), and alloys thereof. As a printing method of the conductive paste, a screen-printing method, a gravure printing method, or the like, may be used, but the present disclosure is not limited thereto.

In the multilayer ceramic electronic component according to the present disclosure, a margin portion (m) may be disposed on both surfaces of the capacitance formation portion ($\alpha_W$, $\alpha_T$) in a second direction (a Y direction). The margin portion may be disposed on both surfaces of the capacitance formation portion ($\alpha_W$, $\alpha_T$) in the second direction (the Y direction) perpendicular to first and third directions (X and Z directions), respectively, or substantially perpendicular to the first and third directions (X and Z directions), respectively, in consideration of an error, margin, or tolerance which may exist in manufacturing and/or measurement. The margin portion (m) may serve to prevent damages to the internal electrodes due to physical or chemical stresses.

The margin portion (m) may be made of an insulating material, and may be made of a ceramic material such as barium titanate. In this case, the margin portion (m) may include the same ceramic material as that included in the dielectric layer 111 or may be made of the same material as the dielectric layer 111.

A method of forming the margin portion (m) is not particularly limited. For example, an area of the dielectric layer included in the capacitance formation portion ($\alpha_W$, $\alpha_T$) is formed to be larger than an area of the internal electrode to form a margin region on a remaining circumference portion of the internal electrode except for a portion connected to the external electrode, or the margin portion (m) may be formed by applying a slurry including ceramic, or may be formed by attaching a dielectric sheet to both surfaces of the capacitance formation portion ($\alpha_W$) in the second direction (the Y direction).

The multilayer ceramic electronic component may include a cover portion (c). The cover portion (c) may be disposed on an outermost side of the first and second internal electrodes 121 and 122. The cover portion (c) may be disposed below the internal electrode at the bottom of the ceramic body 110 and above the internal electrode at the top of the ceramic body 110. In this case, the cover portion (c) may be made of the same composition as the dielectric layer 111, and may be formed by stacking at least one or more dielectric layers that do not include an internal electrode above the internal electrode at the top of the body 110 and below the internal electrode at the bottom of the body 110, respectively. The cover portion (c) may basically serve to prevent damages to the internal electrode due to physical or chemical stresses.

In the multilayer ceramic electronic component according to the present disclosure, a first external electrode 131 and a second external electrode 132 may be disposed on both surfaces of the ceramic body 110 in the first direction (the X direction), that is, on the first surface S1 and the second surface S2 of the ceramic body. The first external electrode 131 may be connected to a first internal electrode 121, and the second external electrode 132 may be connected to a second internal electrode 122.

In one example, the first and second external electrodes 131 and 132 may be disposed on the first surface S1 and the second surface S2 of the ceramic body 110, in the longitudinal direction, which is the first direction, respectively, and may be disposed to extend to the third surface S3 and the fourth surface S4 of the ceramic body 110, in the width direction, which is the second direction, and the fifth surface S5 and the sixth surface S6, in the thickness direction, which is the third direction. The first external electrode 131 disposed to extend to the third to sixth surfaces S3 to S6 of the ceramic body 110 and the second external electrode 132 disposed to extend to the third to sixth surfaces S3 to S6 may be in contact with an auxiliary electrode to be described later to improve the moisture resistance reliability and the mechanical strength of the multilayer ceramic electronic component 100 according to the present disclosure.

According to an embodiment of the present disclosure, the external electrodes 131 and 132 may be disposed to cover the first surface S1 and the second surface S2 of the ceramic body 110, and may include first electrode layers 131a and 132a connected to the internal electrodes 121 and 122 and second electrode layers 131b and 132b disposed on the first electrode layers 131a and 132a.

Specifically, the first external electrode 131 may be disposed on the first surface S1 of the ceramic body 110, and may include a first electrode layer 131a connected to the first internal electrode 121 and a second electrode layer 131b disposed to cover the first electrode layer 131a. In addition, the second external electrode 132 may be disposed on the second surface S2 of the ceramic body 110, and may include a first electrode layer 132a connected to the second internal electrode 122 and a second electrode layer 132b disposed to cover the first electrode layer 132a.

The first electrode layers 131a and 132 may include conductive metal and glass. The conductive metal used in the first electrode layers 131a and 132a is not particularly limited as long as it is a material that can be electrically connected to the internal electrode to form electrostatic capacitance. For example, the conductive metal may be one or more selected from a group consisting of copper (Cu), silver (Ag), nickel (Ni) and alloys thereof.

The first electrode layers 131a and 132a may be formed by applying a conductive paste prepared by adding a glass frit to the conductive metal powder, followed by firing. The first electrode layers 131a and 132a may be disposed to extend to the third surface S3, the fourth surface S4, the fifth surface S5, and the sixth surface S6 of the ceramic body 110.

The second electrode layers 131b and 132b may be formed of conductive metal and glass, or include a conductive polymer including a conductive metal, or the like. The second electrode layers 131b and 132b may be formed on the first electrode layers 131a and 132a, and may be formed to entirely cover the first electrode layers 131a and 132a.

The conductive metal used in the second electrode layers 131b and 132b is not particularly limited as long as it is a material that can be electrically connected to the internal electrode to form electrostatic capacitance. For example, the conductive metal may be one or more selected from a group consisting of copper (Cu), silver (Ag), nickel (Ni) and alloys thereof. The second electrode layers 131b and 132b may be formed by applying a conductive paste prepared by adding a glass frit to the conductive metal powder, followed by firing, or by curing a conductive polymer containing the conductive metal powder.

According to an embodiment of the present disclosure, the second electrode layers 131b and 132b may include different conductive metals from the first electrode layers 131a and 132a. When the second electrode layers 131b and 132b include a conductive metal different from the first electrode layers 131a and 132a, even if peeling of the external electrode occurs due to external stress or the like, the second electrode layers 131b and 132b may be peeled first, such that the moisture resistance reliability can be further improved.

In an embodiment of the present disclosure, in the multilayer ceramic electronic component 100 according to the present disclosure, two or more auxiliary electrodes 141 and 142 may be disposed to be in contact with the first and second external electrodes 131 and 132. The two or more auxiliary electrodes 141 and 142 may be in contact with the first and second external electrodes 131 and 132, and at the same time, may be spaced apart from the capacitance formation portion ($\alpha_W$, $\alpha_T$), and may be disposed in the third direction (the Z direction) of the ceramic body 110. In the present specification, W and V are disposed to be spaced apart, which may mean that W and V are not in contact, and may mean that W and V are disposed at predetermined intervals. In addition, in the present specification, the auxiliary electrode is disposed in the third direction, which may mean that a direction in which a surface of the auxiliary electrode faces is a third direction, and the direction in which the surface of the auxiliary electrode faces is within a predetermined angle based on the third direction. When the two or more auxiliary electrodes 141 and 142 are in contact with the first and second external electrodes 131 and 132, and at the same time, are spaced apart from the capacitance formation portion ($\alpha_W$, $\alpha_T$), and disposed in the third direction (the Z direction) of the ceramic body 110, the bending strength can be improved, and cracking of chips can be prevented.

Figure 2:
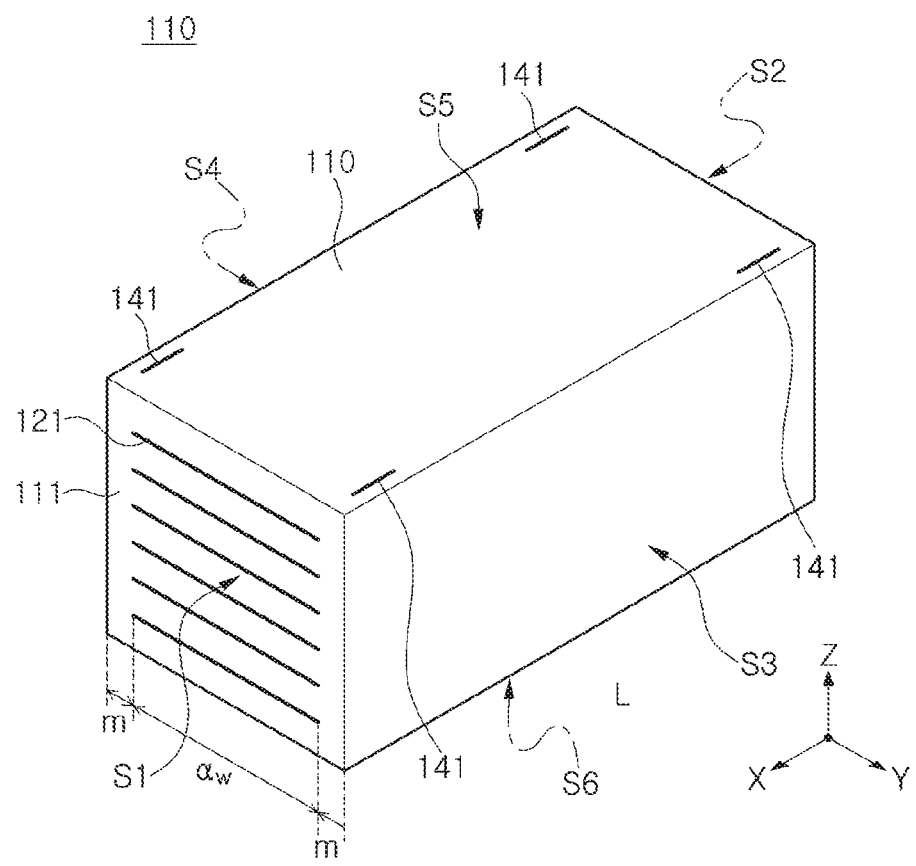
FIG. 2 is a schematic view illustrating a ceramic body according to an embodiment of the present disclosure.
Figure 3:
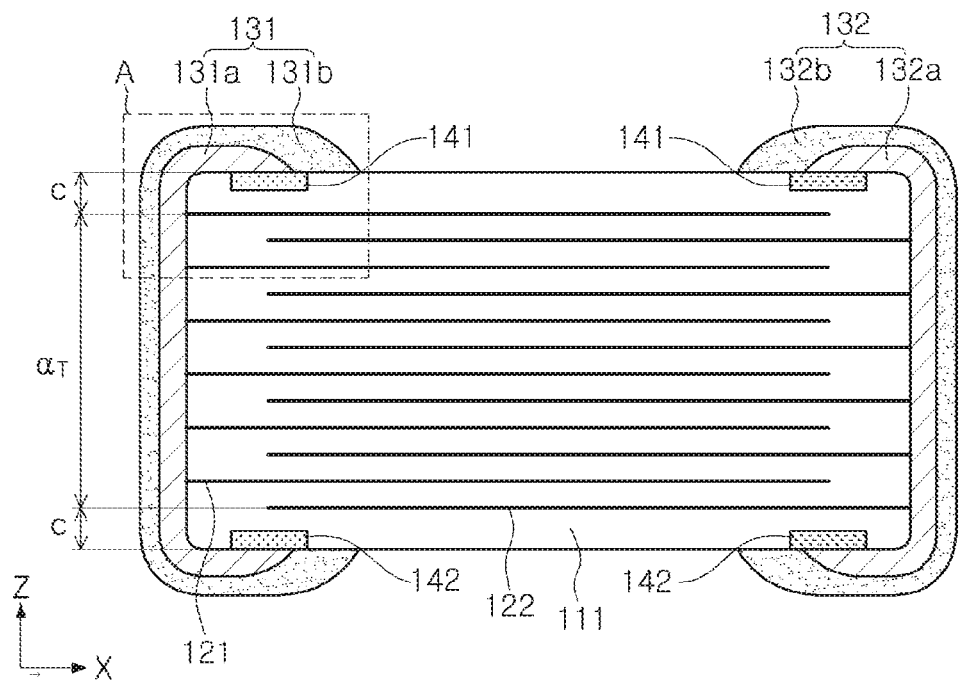
FIG. 3 is a cross-sectional view taken along line I-I' in FIG. 1.
Figure 4:
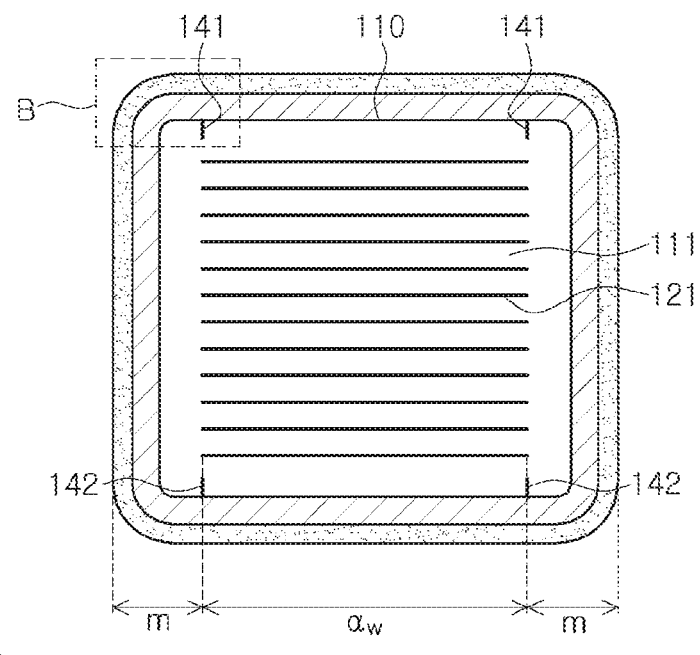
FIG. 4 is a sectional view taken along line II-II' of FIG. 1.

In an embodiment of the present disclosure, the auxiliary electrodes 141 and 142 may be exposed to the fifth surface S5 and the sixth surface S6 of the ceramic body 110. Referring to FIGS. 2 to 4, the auxiliary electrodes 141 and 142 disposed in the third direction (the Z direction) of the ceramic body 110 may be exposed to the surface of the ceramic body 110 through the fifth surface S5 and the sixth surface S6 of the ceramic body 110. Auxiliary electrodes 141 and 142 exposed to the fifth surface S5 and the sixth surface S6 of the ceramic body 110 may be in contact with a first external electrode 131 and a second external electrode 132. The auxiliary electrodes 141 and 142 exposed to the fifth surface S5 and the sixth surface S6 of the ceramic body 110 may be adhered to the first and second external electrodes 131 and 132 in the firing process to be described later, such that it is possible to improve the bending strength of the multilayer ceramic electronic component 100 according to the present disclosure.

Figure 6:
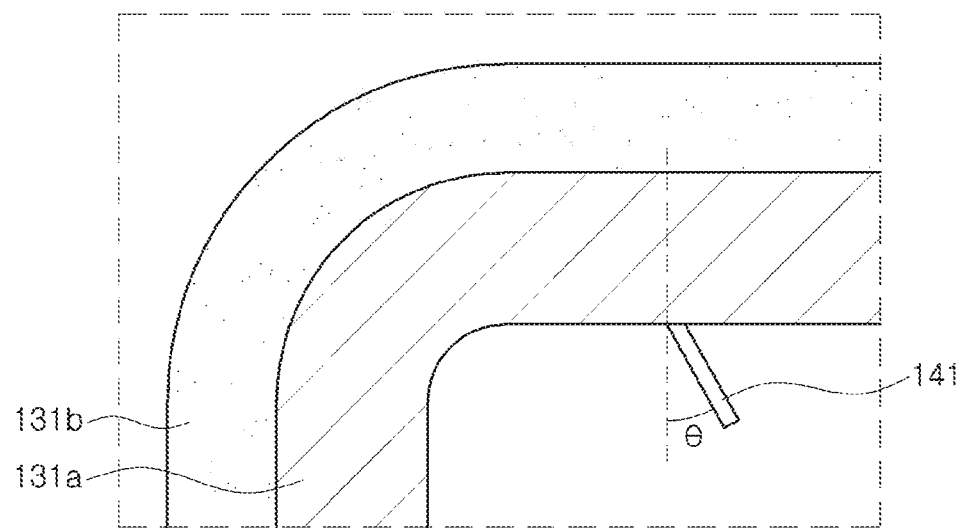
FIG. 6 is an enlarged view of region B of FIG. 4.

In one example, a maximum value of an absolute value of an angle $\theta$ with respect to the third direction (the Z direction) of the auxiliary electrodes 141 and 142 of the multilayer ceramic electronic component according to the present disclosure may be less than 45°. A minimum value of the absolute value of the angle is not particularly limited, but may be, for example, 0° or more. FIG. 4 is a cross-sectional view taken along line II-II' of a multilayer ceramic electronic component according to an embodiment of the present disclosure, and FIG. 6 is an enlarged view of region B of FIG. 4. Referring to FIGS. 4 and 6, the angle $\theta$ of the auxiliary electrodes 141 and 142 with respect to the third direction (the Z direction) may mean a value measured based on a Y-Z plane, at a point in which the auxiliary electrodes 141 and 142 are exposed to the fifth surface S5 or the sixth surface S6 of the ceramic body 110. The maximum value of the absolute value of the angle $\theta$ may mean the largest value among angles $\theta$ of the auxiliary electrodes 141 and 142 in which a plurality thereof are disposed. When the maximum value of the absolute value of the angle $\theta$ of the auxiliary electrodes 141 and 142 with respect to the third direction (the Z direction) is less than 45°, the auxiliary electrodes 141 and 142 may effectively disperse bending stress applied to the multilayer ceramic electronic component according to the present disclosure to prevent cracking of chips.

In another example, a sum of the absolute value of the angle of the plurality of auxiliary electrodes 141 and 142 included in the multilayer ceramic electronic component according to the present disclosure with respect to the third direction (the Z direction) may be 90° or less. The sum of the absolute value of the angle of the auxiliary electrodes 141 and 142 with respect to the third direction may mean a sum of a value measured based on a Y-Z plane, at a point in which the auxiliary electrodes 141 and 142 are exposed to the fifth surface S5 or the sixth surface S6 of the ceramic body 110, as described above. A minimum value of the sum of the absolute value of the angle in the third direction of the auxiliary electrodes 141 and 142 is not particularly limited, but may be, for example, 0° or more. The minimum value of the sum of the absolute value of the angles of the auxiliary electrodes 141 and 142 with respect to the third direction 141 and 142 is 0°, which may mean that all the auxiliary electrodes 141 and 142 are horizontal to the third direction (the Z direction) of the ceramic body 110, and the auxiliary electrodes 141 and 142 are perpendicular to the fifth surface S5 and the sixth surface S6 of the ceramic body 110, or substantially perpendicular to the fifth surface S5 and the sixth surface S6 of the ceramic body 110, in consideration of an error, margin, or tolerance which may exist in manufacturing and/or measurement. When the sum of the absolute value of the angle of the auxiliary electrodes 141 and 142 with respect to the third direction is maintained within a predetermined range, the bending strength of the multilayer ceramic electronic component according to the present disclosure can be further improved.

Figure 5:
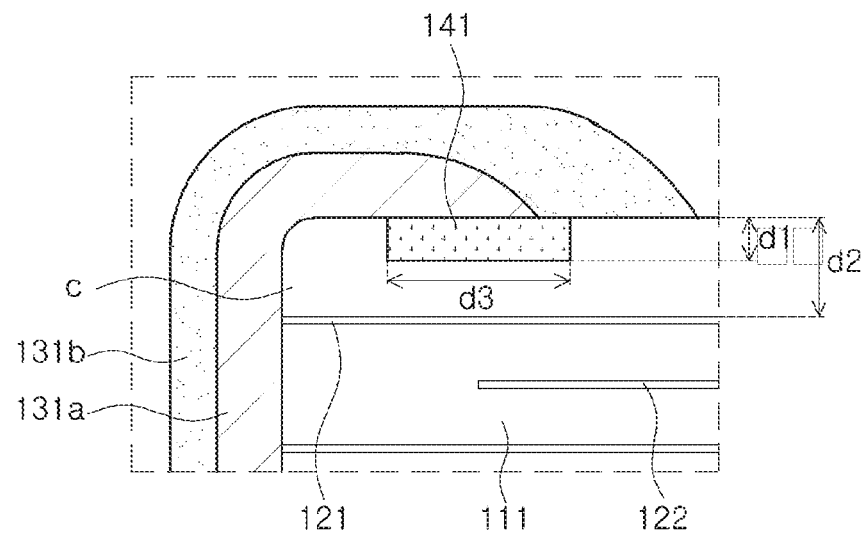
FIG. 5 is an enlarged view of region A of FIG. 3.

In an embodiment of the present disclosure, the auxiliary electrodes 141 and 142 may be disposed between an end of the afore-mentioned first electrode layers 131a and 132a and the inflection point of the ceramic body 110. The end of the first electrode layers 131a and 132a may mean an end portion of a point at which the ceramic body 110 and the first electrode layers 131a and 132a meet, and may mean a point at which all the ceramic body 110, the first electrode layer 131a and 132a, and the second electrode layers 131b and 132b meet. In the present specification, an inflection point may mean a point at which a straight line and a round shape meet, and may mean a point at which the straight line shape ends. Referring to FIG. 5, the inflection point may mean a point at which the straight shape of the sixth surface of the body ends. As described above, when auxiliary electrodes 141 and 142 are disposed between the end of the first electrode layers 131a and 132a and the inflection point of the ceramic body 110, when bending stress is applied to the multilayer ceramic electronic component according to the present disclosure, even if the second electrode layers 131b and 132b are peeled, the first electrode layers 131a and 132a and the auxiliary electrodes 141 and 142 may be combined such that excellent moisture resistance reliability may be ensured.

In another embodiment of the present disclosure, auxiliary electrodes 141 and 142 may be disposed between an end of the first and second external electrodes 131 and 132 and an inflection point of the ceramic body 110. The end of the first and second external electrodes 131 and 132 may mean an end portion of a point at which the ceramic body 110 and the first and second external electrodes 131 and 132 meet, and may mean an end of the second electrode layers 131b and 132b formed on the ceramic body 110. When the auxiliary electrodes 141 and 142 are disposed between the end of the first and second external electrodes 131 and 132 and the inflection point of the ceramic body 110, the auxiliary electrodes 141 and 142 may enhance fixing strength of the first and second external electrodes 131 and 132 to improve the mechanical strength of the multilayer ceramic electronic component according to the present disclosure.

In an embodiment of the present disclosure, the thickness of the auxiliary electrodes 141 and 142 may be in a range of 20 to 50% of the thickness of the cover portion (c). Referring to FIG. 5, a thickness (d1) of the auxiliary electrodes 141 and 142 may mean a distance of the auxiliary electrodes 141 and 142 in the Z direction. In addition, a thickness (d2) of the cover portion (c) may mean a thickness of a dielectric layer in which an internal electrode is not disposed. When the thickness (d1) of the auxiliary electrodes 141 and 142 is less than 20% of the thickness (d2) of the cover portion (c), the bending strength may be weakened and the moisture resistance reliability may be deteriorated, and when the thickness (d1) of the auxiliary electrodes 141 and 142 exceeds 50%, electrical characteristics may be deteriorated by being connected to an effective internal electrode by printing dispersion and/or smearing.

In one example, the thickness (d1) may means a dimension of one of the auxiliary electrodes 141 and 142 in the thickness direction (Z), and may be one of an average thickness, a maximum thickness, and a thickness measured in a center portion of the one of the auxiliary electrodes 141 and 142. The thickness (d2) may be defined similar to the thickness (d1).

In one example, the thickness (d1) may be determined by defining a predetermined number (e.g., 5) of points to the left and the predetermined number (e.g., 5) of points to the right from a reference center point of the one of the auxiliary electrodes 141 and 142 at equal intervals (or non-equal intervals, alternatively), measuring a thickness of each of the points at equal intervals (or non-equal intervals, alternatively), and obtaining an average value therefrom, based on an image of a cross-section cut in an X-Z plane, scanned by, for example, a scanning electron microscope (SEM). The reference center point may have the same distance, or substantially the same distance in consideration of a measurement error, from opposing edges of the one of the auxiliary electrodes 141 and 142 in the cross-section cut. In this case, the thickness (d1) may be an average thickness of the one of the auxiliary electrodes 141 and 142. The thickness (d2) may be defined similar to the thickness (d1).

Alternatively, the thickness (d1) may be determined by defining a predetermined number (e.g., 5) of points to the left and the predetermined number (e.g., 5) of points to the right from a reference center point of one of the auxiliary electrodes 141 and 142 at equal intervals (or non-equal intervals, alternatively), measuring a thickness of each of the points at equal intervals (or non-equal intervals, alternatively), and obtaining a maximum value therefrom, based on an image of a cross-section cut in an X-Z plane, scanned by, for example, a scanning electron microscope (SEM). In this case, the thickness (d1) may be a maximum thickness of the one of the auxiliary electrodes 141 and 142. The thickness (d2) may be defined similar to the thickness (d1).

Alternatively, the thickness (d1) may be a thickness of a reference center point of one of the auxiliary electrodes 141 and 142, based on an image of a cross-section cut in an X-Z plane scanned by, for example, a scanning electron microscope (SEM). The reference center point may have the same distance, or substantially the same distance in consideration of a measurement error, from opposing edges of the one of the auxiliary electrodes 141 and 142 in the cross-section cut. The thickness (d2) may be defined similar to the thickness (d1).

Figure 8:
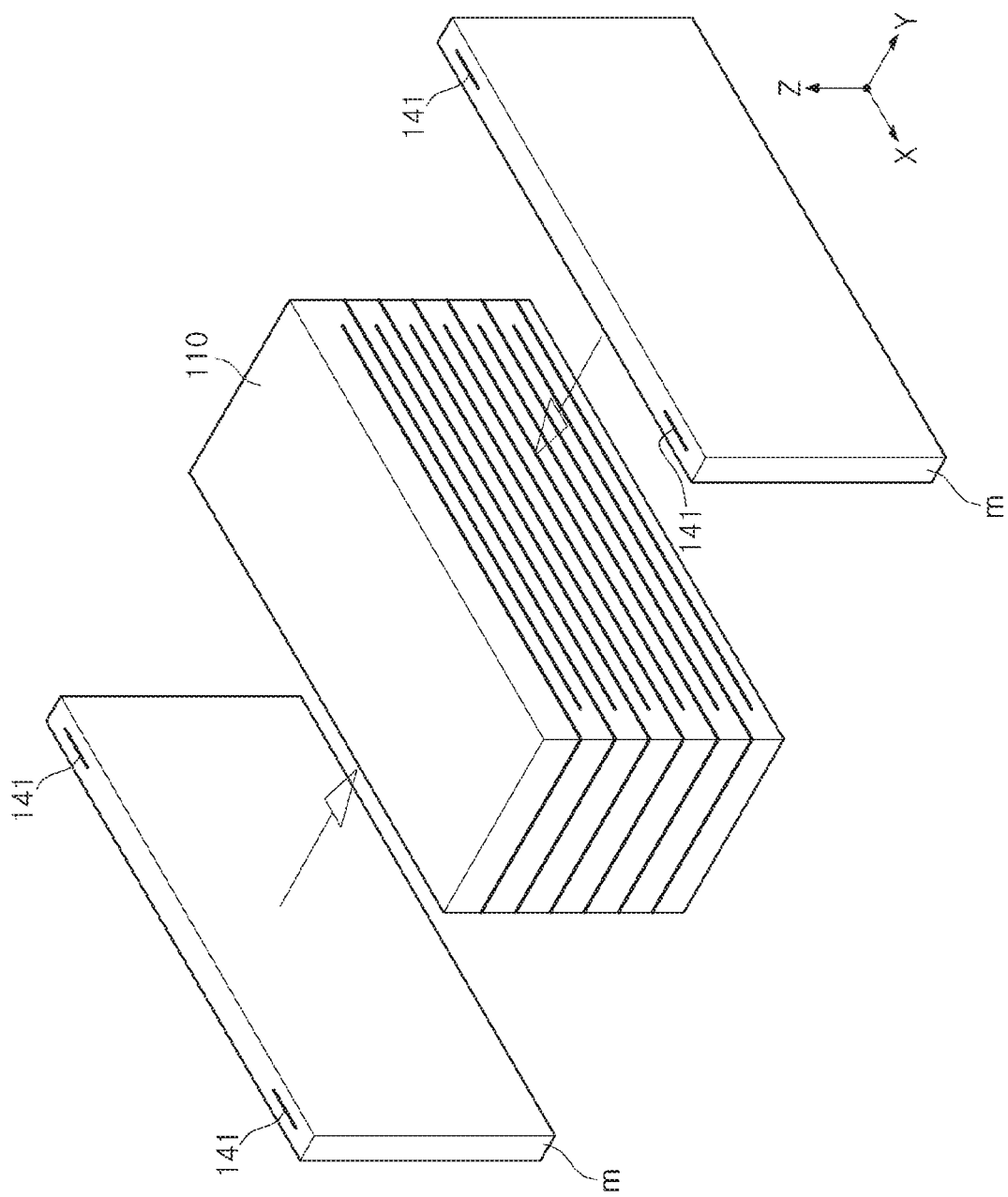
FIGS. 8 and 9 are schematic views illustrating a method of manufacturing a multilayer ceramic electronic component according to an embodiment of the present disclosure.

In one example, auxiliary electrodes 141 and 142 may be disposed in the margin portion (m). FIG. 8 is a schematic view illustrating a portion of manufacturing processes of the multilayer ceramic electronic component according to the present disclosure. Referring to FIG. 8, the auxiliary electrodes 141 and 142 may be attached to the capacitance formation portion after being previously disposed in the margin portion (m). In this case, a process of forming a separate auxiliary electrode in the ceramic body is not necessary, so the process can be simplified.

Figure 9:
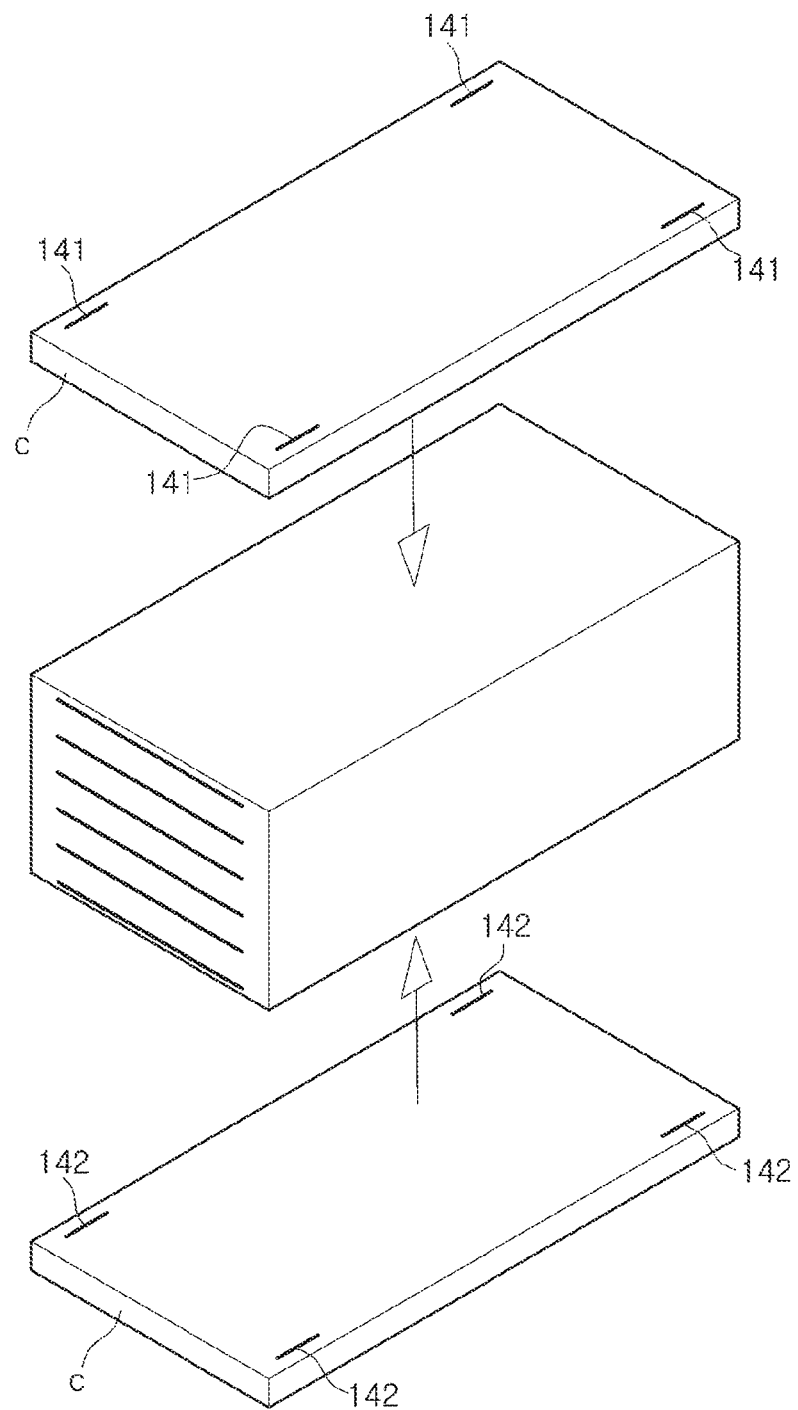

In another example, auxiliary electrodes 141 and 142 may be disposed in the cover portion. FIG. 9 is a schematic view illustrating a portion manufacturing processes of the multilayer ceramic electronic component according to the present disclosure. Referring to FIG. 9, the auxiliary electrodes 141 and 142 may be attached to the capacitance formation portion after being previously disposed in the margin portion (m). In this case, a terminal portion of the external electrode may be strongly fixed, and at the same time, a plurality of auxiliary electrodes may be disposed as described to be later, to further improve the bending strength and moisture resistance reliability of the multilayer ceramic electronic component according to the present disclosure.

According to an embodiment of the present disclosure, the auxiliary electrodes 141 and 142 may include first to eighth auxiliary electrodes. That is, at least one of the auxiliary electrodes 141 and 142 may be disposed at each corner side of the hexahedral ceramic body 110. In this case, a terminal portion of the external electrode, which is easily penetrated by external substances such as moisture, may be strongly fixed to improve bending strength and moisture resistance reliability.

In an embodiment of the present disclosure, six or more auxiliary electrodes may be exposed to the fifth and sixth surfaces of the ceramic body, respectively. Three or more auxiliary electrodes 241 and 251 may be exposed at a position in contact with the first surface S1 on the fifth surface S5 of the ceramic body 210, and three or more auxiliary electrodes 241 and 251 may be exposed at a position in contact with the second surface S2 on the fifth surface S5 of the ceramic body 210. In addition, three or more auxiliary electrodes 242 and 252 may be exposed at a position in contact with the first surface S1 on the sixth surface S6 of the ceramic body 210, and three or more auxiliary electrodes 242 and 252 may be exposed at a position in contact with the second surface S2 on sixth surface S6 of the ceramic body 210. An upper limit of the number of the auxiliary electrodes 241, 242, 251, and 252 exposed to the fifth surface S5 and the sixth surface S6 of the ceramic body 210 is not particularly limited, for example, may be 100 or less or 50 or less.

Figure 7:
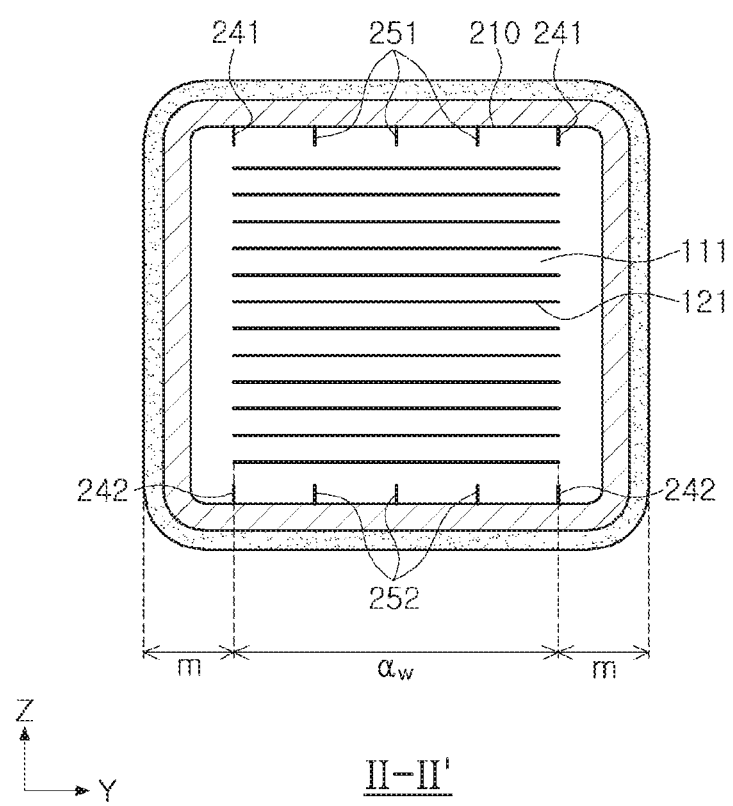
FIG. 7 is a cross-sectional view taken along line II-II' of a multilayer ceramic electronic component according to another embodiment of the present disclosure.

That is, three or more auxiliary electrodes 241, 242, 251, and 252 may be disposed at any corner where the auxiliary electrodes 241, 242, 251, and 252 are exposed in the ceramic body 210. FIG. 7 is a cross-sectional view of a multilayer ceramic electronic component in which ten auxiliary electrodes are exposed to the fifth and sixth surfaces of the ceramic body, respectively. Referring to FIG. 7, when the auxiliary electrodes 241, 242, 251, and 252 are disposed such that six or more thereof are exposed to the fifth surface S5 and the sixth surface S6 of the ceramic body 210, respectively, adhesive strength between the auxiliary electrode and the external electrode can be maximized, thereby increasing the mechanical strength of the multilayer ceramic electronic component, thereby further improving the moisture resistance reliability.

Table 1 below shows results of a bending strength test for a ratio of the thickness of the auxiliary electrode to the thickness of the cover portion. In the bending strength test, 60 sample chips were subjected to bending up to 6 mm at a rate of 1 mm/sec, and a case that deviated by more than ±10% from an initial capacity was classified as defective.

TABLE 1

| Thickness of auxiliary electrode | Bending strength 6 mm | | | | | |
|---|---|---|---|---|---|---|
| | a LOT | b LOT | c LOT | d LOT | e LOT | Remark |
| 60% | 0/60 | 0/60 | 0/60 | 0/60 | 0/60 | Defects are not generated |
| 50% | 0/60 | 0/60 | 0/60 | 0/60 | 0/60 | Defects are not generated |
| 40% | 0/60 | 0/60 | 0/60 | 0/60 | 0/60 | Defects are not generated |
| 30% | 0/60 | 0/60 | 0/60 | 0/60 | 0/60 | Defects are not generated |
| 20% | 1/60 | 1/60 | 1/60 | 0/60 | 0/60 | Decrease in defects |
| 10% | 0/60 | 1/60 | 2/60 | 2/60 | 0/60 | Decrease in defects |
| 0% | 0/60 | 2/60 | 3/60 | 4/60 | 4/60 | Decrease in defects |

Referring to Table 1, it can be seen that a defective sample is generated while a ratio of the thickness of the auxiliary electrode to the thickness of the cover portion decreases from 30% to 10%, and even when the ratio is 60%, it has excellent bending strength that does not generate defects.

Table 2 below shows results of a moisture resistance reliability test for a ratio of the thickness of the auxiliary electrode to the thickness of the cover portion. The moisture resistance reliability was investigated by counting the number of multilayer ceramic electronic components in which defects are generated among 400 samples when a voltage of 2 Vr was applied for 48 hours at a temperature of 85° C. and a relative humidity of 85%.

TABLE 2

| Thickness of auxiliary electrode | 85° C. 85% 48 Hr test | | | | | |
|---|---|---|---|---|---|---|
| | a LOT | b LOT | c LOT | d LOT | e LOT | Remarks |
| 60% | 0/500 | 0/500 | 3/500 | 0/500 | 0/500 | Increase in defects |
| 50% | 0/500 | 0/500 | 0/500 | 0/500 | 0/500 | Defects are not generated |
| 40% | 0/500 | 0/500 | 0/500 | 0/500 | 0/500 | Defects are not generated |
| 30% | 0/500 | 0/500 | 0/500 | 0/500 | 0/500 | Defects are not generated |
| 20% | 0/500 | 0/500 | 1/500 | 3/500 | 5/500 | Decrease in defects |
| 10% | 1/500 | 0/500 | 2/500 | 8/500 | 10/500 | Decrease in defects |
| 0% | 6/500 | 0/500 | 7/500 | 15/500 | 18/500 | Decrease in defects |

Referring to Table 2, it can be seen that when a ratio of the thickness of the auxiliary electrode to the thickness of the cover portion decreases from 30% to 10%, defective parts are generated among samples. In addition, it can be seen that defective parts are generated among samples from the ratio exceeds 50%. Thereby, it can be seen that the thickness of the auxiliary electrode of the present disclosure should fall within the range of 20% to 50% of the thickness of the cover portion.

As set forth above, according to an aspect of the present disclosure, a multilayer ceramic electronic component having excellent bending strength by applying an auxiliary electrode may be provided.

According to another aspect of the present disclosure, a multilayer ceramic electronic component having excellent moisture resistance reliability may be provided by applying an auxiliary electrode.

According to another aspect of the present disclosure, an auxiliary electrode may be applied to prevent cracking and enhance mechanical strength.

However, various and advantageous advantages and effects of the present disclosure are not limited to the above description, and will be more readily understood in the course of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
   a ceramic body including a capacitance formation portion including a dielectric layer and first and second internal electrodes disposed to be stacked in a third direction with the dielectric layer interposed therebetween, a margin portion disposed on both surfaces of the capacitance formation portion in a second direction, and a cover portion disposed on both surfaces of the capacitance formation portion in the third direction, and including first and second surfaces opposing each other in a first direction, third and fourth surfaces opposing each other in the second direction, and fifth and sixth surfaces opposing each other in the third direction;
   first and second external electrodes disposed on the first and second surfaces of the ceramic body, respectively; and a first auxiliary electrode disposed in the cover portion and spaced apart from the capacitance formation portion, and disposed to be in contact with one of the first and second external electrodes,
wherein the first auxiliary electrode is spaced apart from the first surface and the second surface of the ceramic body.

2. The multilayer ceramic electronic component of claim 1, wherein the first and second external electrodes extend to the third to sixth surfaces of the ceramic body.

3. The multilayer ceramic electronic component of claim 1, wherein the first auxiliary electrode is exposed to one of the fifth and sixth surfaces of the ceramic body.

4. The multilayer ceramic electronic component of claim 1, wherein a maximum value of an absolute value of an angle of the first auxiliary electrode with respect to the third direction is less than 45°.

5. The multilayer ceramic electronic component of claim 1, further comprising a second auxiliary electrode spaced apart from the first surface and the second surface of the ceramic body,
wherein the first and second auxiliary electrodes are disposed on opposing sides of the capacitance formation portion, and
a sum of absolute values of angles of the first and second auxiliary electrodes with respect to the third direction is 90° or less.

6. The multilayer ceramic electronic component of claim 1, wherein the first and second external electrodes comprise a first electrode layer connected to the first and second internal electrode layers, respectively, and a second electrode layer disposed on the first electrode layer, respectively, and
the first auxiliary electrode is disposed between an end of the first electrode layer and an inflection point of the ceramic body.

7. The multilayer ceramic electronic component of claim 1, wherein the first auxiliary electrode is disposed between an end of the one of the first and second external electrodes and an inflection point of the ceramic body.

8. The multilayer ceramic electronic component of claim 1, wherein a thickness of the first auxiliary electrode is in a range of 20% to 50% of a thickness of the cover portion.

9. The multilayer ceramic electronic component of claim 1, wherein the first auxiliary electrode is disposed in the margin portion.

10. The multilayer ceramic electronic component of claim 1, further comprising second to eighth auxiliary electrodes.

11. The multilayer ceramic electronic component of claim 10, wherein six or more among the first to eighth auxiliary electrodes are exposed to the fifth and sixth surfaces of the ceramic body.

12. A multilayer ceramic electronic component, comprising:
a ceramic body including first and second surfaces opposing each other in a first direction, third and fourth surfaces opposing each other in a second direction, and fifth and sixth surfaces opposing each other in a third direction, and including a dielectric layer and first and second internal electrodes stacked in the third direction with the dielectric layer interposed therebetween;
first and second external electrodes disposed on the first and second surfaces of the ceramic body, respectively; and
an auxiliary electrode exposed to one of the fifth and sixth surfaces and connected to one of the first and second external electrodes,
wherein a value of an absolute value of an angle of the auxiliary electrode with respect to the third direction is less than 45°.

13. The multilayer ceramic electronic component of claim 12, wherein the one of the first and second external electrodes comprises a first electrode layer connected to one of the first and second internal electrode layers, and a second electrode layer disposed on the first electrode layer, and
the auxiliary electrode is in contact with the first electrode layer.

14. The multilayer ceramic electronic component of claim 13, wherein the auxiliary electrode is in contact with the second electrode layer.

15. The multilayer ceramic electronic component of claim 12, wherein the ceramic body includes a capacitance formation portion including the dielectric layer and the first and second internal electrodes, a margin portion disposed on both surfaces of the capacitance formation portion in the second direction, and a cover portion disposed on both surfaces of the capacitance formation portion in the third direction, and
a thickness of the auxiliary electrode is in a range of 20% to 50% of a thickness of the cover portion.

16. The multilayer ceramic electronic component of claim 15, wherein the auxiliary electrode is disposed in the margin portion.

17. The multilayer ceramic electronic component of claim 15, wherein the auxiliary electrode is disposed in the cover portion.

18. A multilayer ceramic electronic component, comprising:
a ceramic body including a capacitance formation portion including a dielectric layer and first and second internal electrodes disposed to be stacked in a third direction with the dielectric layer interposed therebetween, a margin portion disposed on both surfaces of the capacitance formation portion in a second direction, and a cover portion disposed on both surfaces of the capacitance formation portion in the third direction, and including first and second surfaces opposing each other in a first direction, third and fourth surfaces opposing each other in the second direction, and fifth and sixth surfaces opposing each other in the third direction;
first and second external electrodes disposed on the first and second surfaces of the ceramic body, respectively; and
two or more auxiliary electrodes disposed in the cover portion or the margin portion, and disposed in contact with one of the first and second external electrodes,
wherein the first and second external electrodes comprise a first electrode layer connected to the first and second internal electrode layers, respectively, and a second electrode layer disposed on the first electrode layer, respectively, and
wherein at least one of the two or more auxiliary electrodes is spaced apart from the first surface and the second surface of the ceramic body.

19. The multilayer ceramic electronic component of claim 18, wherein the first electrode layers include conductive metal and glass, and
the conductive metal is one or more selected from a group consisting of copper (Cu), silver (Ag), nickel (Ni) and alloys thereof, and
the first electrode layers are disposed to be in contact with the auxiliary electrodes on the fifth surface and the sixth surface of the ceramic body, respectively.

20. The multilayer ceramic electronic component of claim 19, wherein the second electrode layers include conductive metal and glass, and
the conductive metal is one or more selected from a group consisting of copper (Cu), silver (Ag), nickel (Ni) and alloys thereof, and
the second electrode layers are disposed to be in contact with the auxiliary electrodes on the fifth surface and the sixth surface of the ceramic body, respectively.

21. The multilayer ceramic electronic component of claim 20, wherein the first and second external electrodes extend to the third to sixth surfaces of the ceramic body.

22. The multilayer ceramic electronic component of claim 19, wherein a ratio of the thickness of the auxiliary electrode to the thickness of the cover portion is more than 10% to 60% or less.

23. The multilayer ceramic electronic component of claim 18, wherein the second electrode layers include conductive metal and glass, and
the conductive metal is one or more selected from a group consisting of copper (Cu), silver (Ag), nickel (Ni) and alloys thereof, and
the second electrode layers are disposed to be in contact with the auxiliary electrodes on the fifth surface and the sixth surface of the ceramic body, respectively.

24. The multilayer ceramic electronic component of claim 18, wherein a ratio of the thickness of the auxiliary electrode to the thickness of the cover portion is more than 10% to 60% or less.

25. The multilayer ceramic electronic component of claim 18, wherein a thickness of the first auxiliary electrode is in a range of 20% to 50% of a thickness of the cover portion.

26. The multilayer ceramic electronic component of claim 18, wherein a thickness of the first auxiliary electrode is in a range of 30% to 60% of a thickness of the cover portion.

* * * * *